(12) United States Patent
Hanaoka et al.

(10) Patent No.: US 10,549,369 B2
(45) Date of Patent: Feb. 4, 2020

(54) NUMERICAL CONTROLLER

(71) Applicant: FANUC CORPORATION, Minamitsuru-gun, Yamanashi (JP)

(72) Inventors: Tsukasa Hanaoka, Yamanashi (JP); Kazuhiko Murakawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 23 days.

(21) Appl. No.: 15/869,968

(22) Filed: Jan. 12, 2018

(65) Prior Publication Data
US 2018/0207737 A1 Jul. 26, 2018

(30) Foreign Application Priority Data
Jan. 26, 2017 (JP) ................... 2017-012430

(51) Int. Cl.
*B23H 7/20* (2006.01)
*G05B 19/402* (2006.01)

(52) U.S. Cl.
CPC ............ *B23H 7/20* (2013.01); *G05B 19/402* (2013.01); *G05B 2219/50331* (2013.01)

(58) Field of Classification Search
CPC ........... G05B 2219/45043; G05B 2219/45221; G05B 19/404; G05B 2219/50331
USPC ................................. 700/162, 193
See application file for complete search history.

(56) References Cited

U.S. PATENT DOCUMENTS 4,703,146 A * 10/1987 Kinoshita .............. B23H 7/065
219/69.12
5,072,089 A 12/1991 Higashi
7,371,989 B2 5/2008 Miyajima et al.
9,442,479 B2 9/2016 Kobayashi et al.
2004/0084419 A1* 5/2004 Kato .................... B23H 7/065
219/69.12
2007/0068905 A1 3/2007 Miyajima et al.
(Continued)

FOREIGN PATENT DOCUMENTS

DE 9218090 U1 10/1993
EP 0920944 A2 6/1999
(Continued)

OTHER PUBLICATIONS

Notification of Reasons for Refusal for Japanese Application No. 2017-012430, dated Sep. 4, 2018 with translation, 5 pages.
(Continued)

*Primary Examiner* — Michael J Brown
(74) *Attorney, Agent, or Firm* — RatnerPrestia

(57) ABSTRACT

The numerical controller creates a machining path on which a wire electrode is moved by analyzing blocks of a machining program, and creates interpolation data indicating an amount of movement for each interpolation period on the machining path. Further, the numerical controller calculates a length of the wire electrode used for machining (machined surface length) for each interpolation period, calculates a consumption amount of the wire electrode for each interpolation period, calculates a compensation amount for compensating the amount of movement based on the interpolation data, on the basis of the calculated consumption amount and compensates the amount of movement indicated by the interpolation data, based on the calculated compensation amount.

2 Claims, 10 Drawing Sheets

(56) References Cited

U.S. PATENT DOCUMENTS

| | | | | |
|---|---|---|---|---|
| 2013/0150999 A1* | 6/2013 | Arakawa | ................ | B23H 7/065 |
| | | | | 700/162 |
| 2014/0135975 A1 | 5/2014 | Kobayashi et al. | | |
| 2016/0158863 A1* | 6/2016 | Hiraga | ................ | G05B 19/188 |
| | | | | 219/69.15 |

FOREIGN PATENT DOCUMENTS

| | | |
|---|---|---|
| EP | 0920945 A2 | 6/1999 |
| JP | S59007525 A | 1/1984 |
| JP | 63120030 A | 5/1988 |
| JP | 01264722 A | 10/1989 |
| JP | 11165219 A | 6/1999 |
| JP | H11165220 A | 6/1999 |
| JP | 2004-142027 | 5/2004 |
| JP | 2007083372 A | 4/2007 |
| JP | 2014097541 A | 5/2014 |

OTHER PUBLICATIONS

Extended European Search Report for European Application No. 18 151 551.1, dated Jun. 27, 2018, 8 pages.

Decision to Grant a Patent for Japanese Application No. 2017-012430, dated Feb. 5, 2019, with translation, 5 pages.

* cited by examiner

NUMERICAL CONTROLLER

CROSS-REFERENCE TO RELATED APPLICATIONS

This application is a new U.S. Patent Application that claims benefit of Japanese Patent Application No. 2017-012430, filed Jan. 26, 2017, the disclosure of this application is being incorporated herein by reference in its entirety for all purposes.

BACKGROUND OF THE INVENTION

1. Field of the Invention

The present invention relates to a numerical controller, and particularly relates to a numerical controller that performs wire electrode compensation in consideration of a machined surface length.

2. Description of the Related Art

Wire electric discharge machining (wire-EDM) generates discharge by applying a voltage between a workpiece and a wire electrode, and machines the workpiece into an arbitrary shape using this discharge phenomenon. As illustrated in FIG. 7, in the wire-EDM, a wire electrode 2 is fed in a direction from an upper surface to a lower surface of a workpiece 4 at a constant speed while being supported by an upper guide 3a and a lower guide 3b, and discharge is generated at a position at which the workpiece 4 and the wire electrode 2 face each other to remove a part of the workpiece 4, thereby performing machining.

In the wire-EDM, the wire electrode is consumed by discharge with the workpiece as machining of the workpiece advances. For example, in a case illustrated in FIG. 7, each time discharge is generated between the workpiece 4 and the wire electrode 2 during feeding from the upper surface to the lower surface of the workplace 4, the wire electrode 2 is consumed and becomes thinner, and a diameter thereof becomes smaller.

Meanwhile, since a center of the wire electrode 2 and an offset quantity (a value obtained by adding a gap amount between the wire electrode 2 and the workplace 4 to a radius of the wire electrode) of a shape to be machined from a program path are fixed, the gap amount increases toward a lower side of the workpiece 4 as the wire electrode 2 becomes thinner, so that the machining becomes insufficient. Further, a machining groove width and a machining amount become small.

For example, as illustrated in FIG. 7, when it is assumed that the wire electrode 2 is consumed by a wire electrode consumption amount d while being fed by a distance corresponding to a workpiece thickness h, a wire electrode diameter b around the lower surface of the workpiece 4 corresponds to a value obtained by subtracting the wire electrode consumption amount d from an original wire electrode diameter a (d=a−b), and an uncut portion of a width d/2 is generated on a product side on the lower surface of the workpiece 4.

In a conventional technology, to prevent an uncut portion from being generated on a workpiece product side caused by consumption of the wire electrode 2, as illustrated in FIG. 8, paths of the upper guide 3a and the lower guide 3b are corrected by adjusting the offset quantity (for example, see Japanese Patent Application Laid-open No. 2004-142027). Here, since an offset quantity to be used here is uniquely determined by a combination of a workpiece thickness, a workpiece material, a type of the wire electrode, a diameter of the wire electrode, a machining condition, etc., values measured by performing machining in advance with respect to a plurality of combinations thereof may be stored in advance in a nonvolatile memory of a control apparatus, and an offset quantity can be determined in subsequent machining by reading a combination having a matching workpiece thickness h, workpiece material, type of the wire electrode, diameter of the wire electrode, machining condition, etc. from the nonvolatile memory.

However, the above-described technology disclosed in Japanese Patent Application Laid-Open No. 2004-142027 does not adapts to a situation in which the wire electrode consumption amount d changes during the wire-EDM. For example, as illustrated in FIG. 9, when a distance between the upper surface and the lower surface of the workpiece 4 to be machined varies depending on the machining position, the wire electrode consumption amount d changes depending on the position (machining position) of the wire electrode 2 in the middle of a movement path according to one movement command. Thus, in a method of correcting a path by offset such as a method described in Japanese Patent . Application Laid-Open No. 2004-142027 in which a set offset value is used without, change, compensation cannot be performed according to the wire electrode consumption amount d that changes from moment to moment, and thus there is a problem that an uncut portion is generated.

In addition, considering performing taper machining illustrated in FIG. 10A, a machined surface length ($h_t$ to $h_5$) of the workpiece 4 illustrated in FIG. 10B changes from moment to moment, and the wire electrode consumption amount d changes depending on the position (machining position) of the wire electrode 2 in the middle of a movement path according to one movement command. For this reason, in a method of correcting a path by offset such as the above-described technology of Japanese Patent Application Laid-Open No. 2004-142027, as illustrated in FIG. 11, compensation cannot be performed according to the wire electrode consumption amount that changes from moment to moment, and thus there is a problem that an uncut portion is generated.

SUMMARY OF THE INVENTION

In view of the above, an object of the invention is to provide a numerical controller that performs wire electrode compensation in consideration of a machined surface length.

In this invention, as shown in FIG. 1, on the assumption that a wire electrode consumption amount according to a combination of a workpiece thickness, a workpiece material, a type of a wire electrode, a diameter of the wire electrode, a machining condition, etc. is registered in advance in a memory in the form of a table, etc. as machining condition data, a machined surface length $h_t$ of a wire electrode is obtained from an upper guide position and a lower guide position that change from moment to moment in wire-EDM, a wire electrode consumption amount $d_t$ in the machined surface length $h_t$ is calculated from a ratio of a tentative workpiece thickness $h_v$ to the machined surface length $h_t$ and a wire electrode consumption amount d acquired from the machining condition data, and the upper guide position and the lower guide position are corrected for each interpolation period based on the calculated wire electrode consumption amount dlf thereby solving the above-mentioned problem.

The numerical controller according to the invention controls a wire electric discharge machine based on a machining program to move a wire electrode with respect to a workpiece, thereby machining the workpiece using the wire electrode. The numerical controller includes a machining path creation unit that creates a machining path to move the wire electrode by analyzing blocks of the machining program, an interpolation unit that creates interpolation data indicating an amount of movement for each interpolation period on the machining path based on the machining path created by the machining path creation unit, a machined surface length calculation unit that calculates a machined surface length corresponding to a length of the wire electrode to be used for the machining for each interpolation period, an electrode consumption amount calculation unit that calculates a consumption amount of the wire electrode for each interpolation period based on the machined surface length for each interpolation period, and a compensation amount calculation unit that calculates a compensation amount for compensating the amount of movement according to the interpolation data based on the consumption amount of the wire electrode for each interpolation period calculated by the electrode consumption amount calculation unit. Further, the numerical controller moves the wire electrode on the basis of the amount of movement, based on the interpolation data that is compensated by the compensation amount calculated by the compensation amount calculation unit.

The wire electric discharge machine may include an upper guide and a lower guide supporting the wire electrode, and the compensation amount calculated by the compensation amount calculation unit may correspond to compensation amounts of amounts of movement of the upper guide and the lower guide for each interpolation period.

According to the invention, it is possible to implement highly accurate machining without an uncut portion even in machining in which a machined surface length change from moment to moment.

DETAILED DESCRIPTION OF THE PREFERRED EMBODIMENTS

Figure 1:
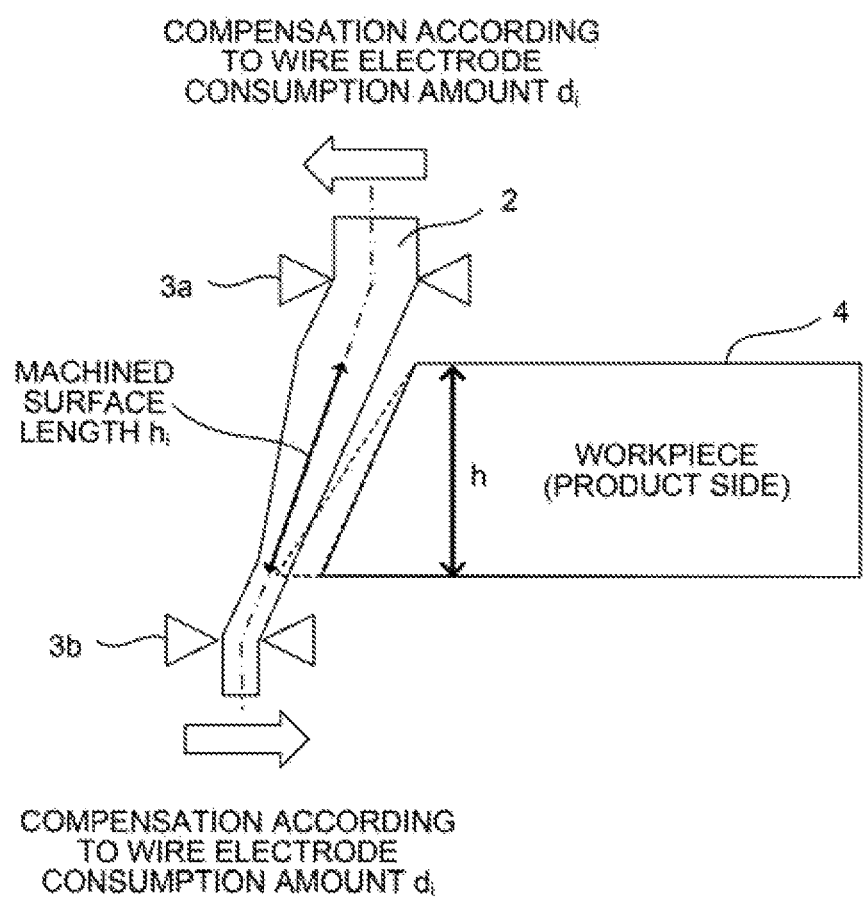
FIG. 1 is a diagram illustrating an outline of a wire electrode compensation method of the invention.
Figure 2:
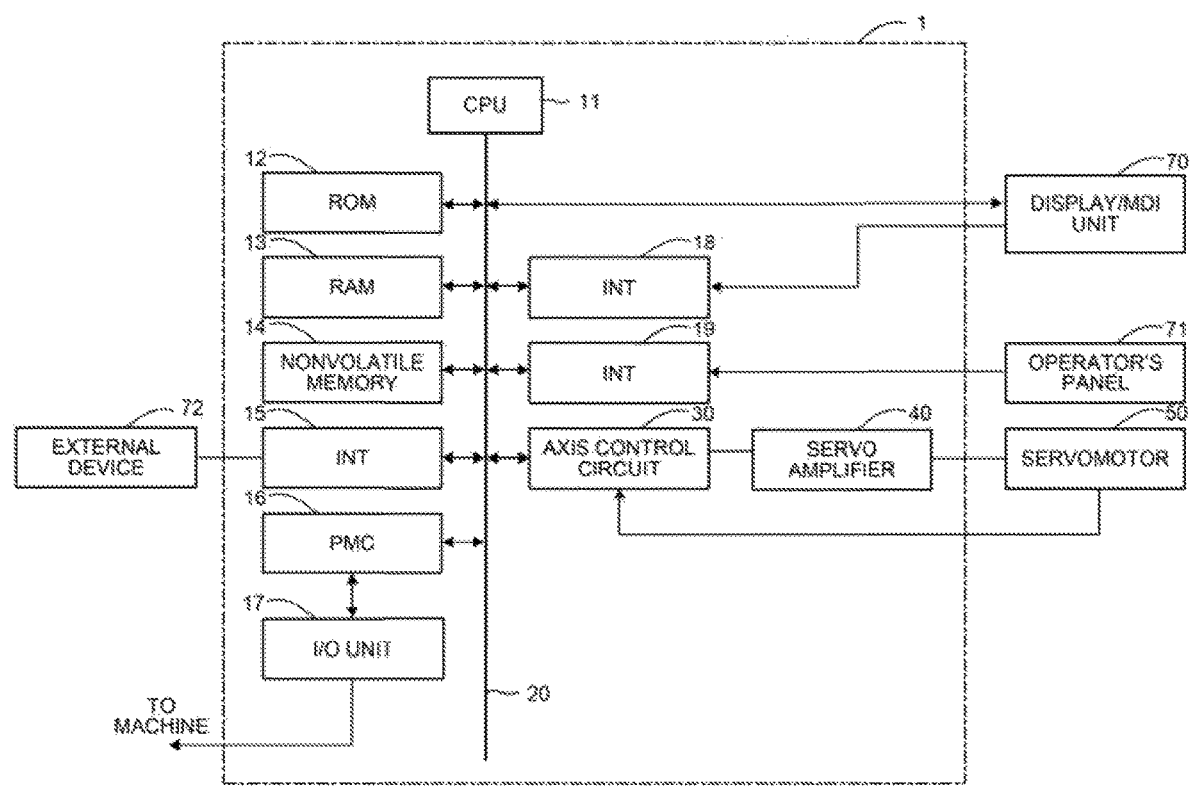
FIG. 2 is a schematic hardware configuration diagram of a numerical controller according to an embodiment of the invention.

FIG. 2 is a hardware configuration diagram illustrating a main part of a numerical controller according to an embodiment of the invention.

A central processing unit (CPU) 11 included in a numerical controller 1 is a processor that controls the numerical controller 1 as a whole. The CPU 11 reads a system program stored in a read only memory (ROM) 12 via a bus 20, and controls the entire numerical controller 1 according to the system program. A random access memory (RAM) 13 stores temporary calculation data or display data, various data input by an operator via a display/manual data input (MDI) unit 70 described below, etc.

A nonvolatile memory 14 is configured as a memory maintained in a storage state even when a power supply of the numerical controller 1 is turned OFF, for example, by being backed up by a battery (not illustrated). The nonvolatile memory 14 stores a machining program read via an interface 15 or a machining program input via the display/MDI unit 70 described below. The nonvolatile memory 14 further stores a machining program operation machining program, etc. used to execute the machining program, and these programs are developed in the RAM 13 at the time of execution. In addition, various system programs (including a system program of wire electrode compensation) necessary to control a wire electric discharge machine are written to the ROM 12 in advance.

The interface 15 is an interface for connecting the numerical controller 1 to an external device 72 such as an adapter. A machining program, various parameters, etc. are read from the external device 72 side. In addition, a machining program edited in the numerical controller 1 can be stored in external storage means via the external device 72. A programmable machine controller (PMC) 16 outputs a signal to a peripheral device of the machining machine (for example, an actuator such as a robot hand for tool exchange) via an input/output (I/O) unit. 17 to control the peripheral device using a sequence program built in the numerical controller 1. In addition, the PMC 16 receives signals from various switches, etc. of an operator's panel provided in a main body of the machining machine, performs necessary signal processing, and then passes the signals to the CPU 11.

The display/MDI unit 70 is a manual data input device including a display, a keyboard, etc. An interface 18 receives a command and data from the keyboard of the display/MDI unit 70 and passes the command and data to the CPU 11. An interface 19 is connected to an operator's panel 71 having a manual pulse generator, etc. used to manually drive each axis.

An axis control circuit. 30 for controlling an axis included in the machining machine receives a movement command amount of the axis from the CPU 11, and outputs a command for the axis to a servo amplifier 40. The servo amplifier 40 receives this command, and drives a servomotor 50 that moves the axis included in the machining machine. The servomotor 50 of the axis incorporates a position/speed detector, and feeds back a position/speed feedback signal from the position/speed detector to the axis control circuit 30, thereby performing feedback control of a position/speed. In the hardware configuration diagram of FIG. 2, only one axis control circuit 30, one servo amplifier 40, and one servomotor 50 are illustrated. However, in practice, the number of axis control circuits 30, the number of servo amplifiers 40, and the number of servomotors 50 are the same as the number of axes included in the machining machine, respectively. For example, in the case of the numerical controller that controls the wire electric discharge machine of the present embodiment, the axis control circuits 30, the servo amplifiers 40, and the servomotors 50 are prepared to control an X axis, a Y axis, a Z axis, a U axis, a V axis, etc.

Figure 3:
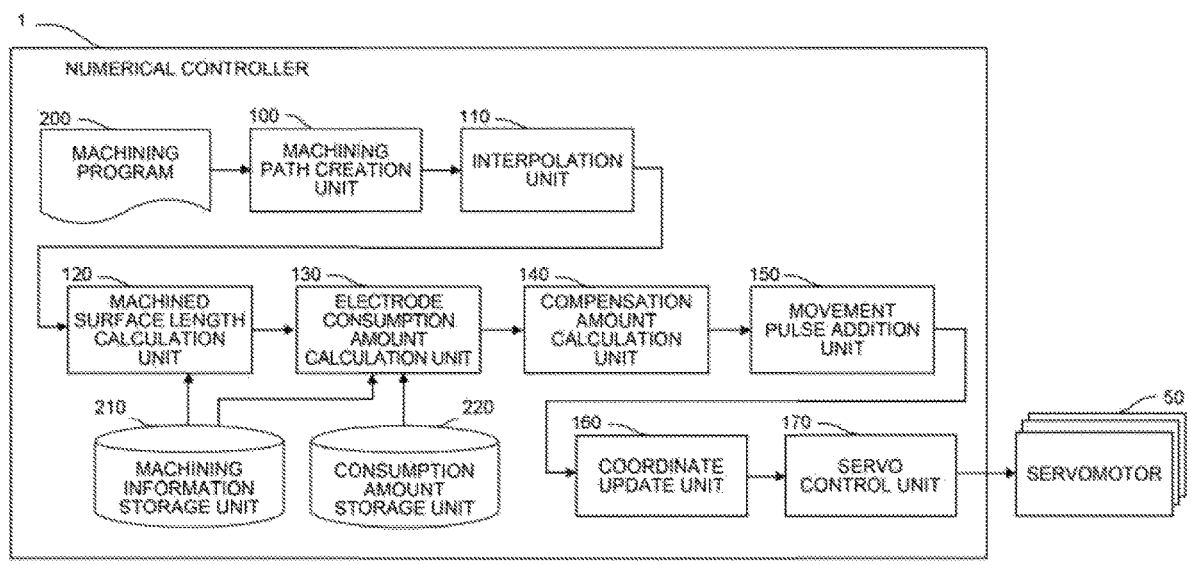
FIG. 3 is a schematic function block diagram of the numerical controller according to the embodiment of the invention.

FIG. 3 is a schematic function block diagram of the numerical controller according to the embodiment of the invention in a case in which a system program for implementing wire electrode compensation function in consideration of a machined surface length is mounted on the numerical controller 1 illustrated in FIG. 2.

Each function block illustrated in FIG. 3 is implemented when the CPU 11 included in the numerical controller 1 illustrated in FIG. 2 executes a system program necessary to control the wire electric discharge machine and controls an operation of each unit of the numerical controller 1. The numerical controller 1 of the present embodiment includes a machining path creation unit 100, an interpolation unit 110, a machined surface length calculation unit 120, an electrode consumption amount calculation unit 130, a compensation amount calculation unit 140, a movement pulse addition unit 150, a coordinate update unit 160, and a servo control unit 170.

The machining path creation unit 100 successively reads and analyzes blocks that command operation of the wire electric discharge machine to be controlled from a machining program 200 stored in a memory (not illustrated), and creates a machining path used for machining of a workpiece, based on an analysis result. Since a program path commanded by each block of the machining program 200 indicates a shape of the workpiece to be machined, the machining path creation unit 100 creates a machining path in which a diameter of a wire electrode and a gap amount between the wire electrode and the workpiece are taken into consideration, with respect to the program path. Although not described in FIG. 3, the machining path creation unit 100 uses information stored in a machining information storage unit 210 when creating the machining path.

The interpolation unit 110 creates interpolation data (amount of movement of each axis for each interpolation period) indicating the amount of movement for each interpolation period on the machining path, based on the machining path created by the machining path creation unit 100.

Figure 4:
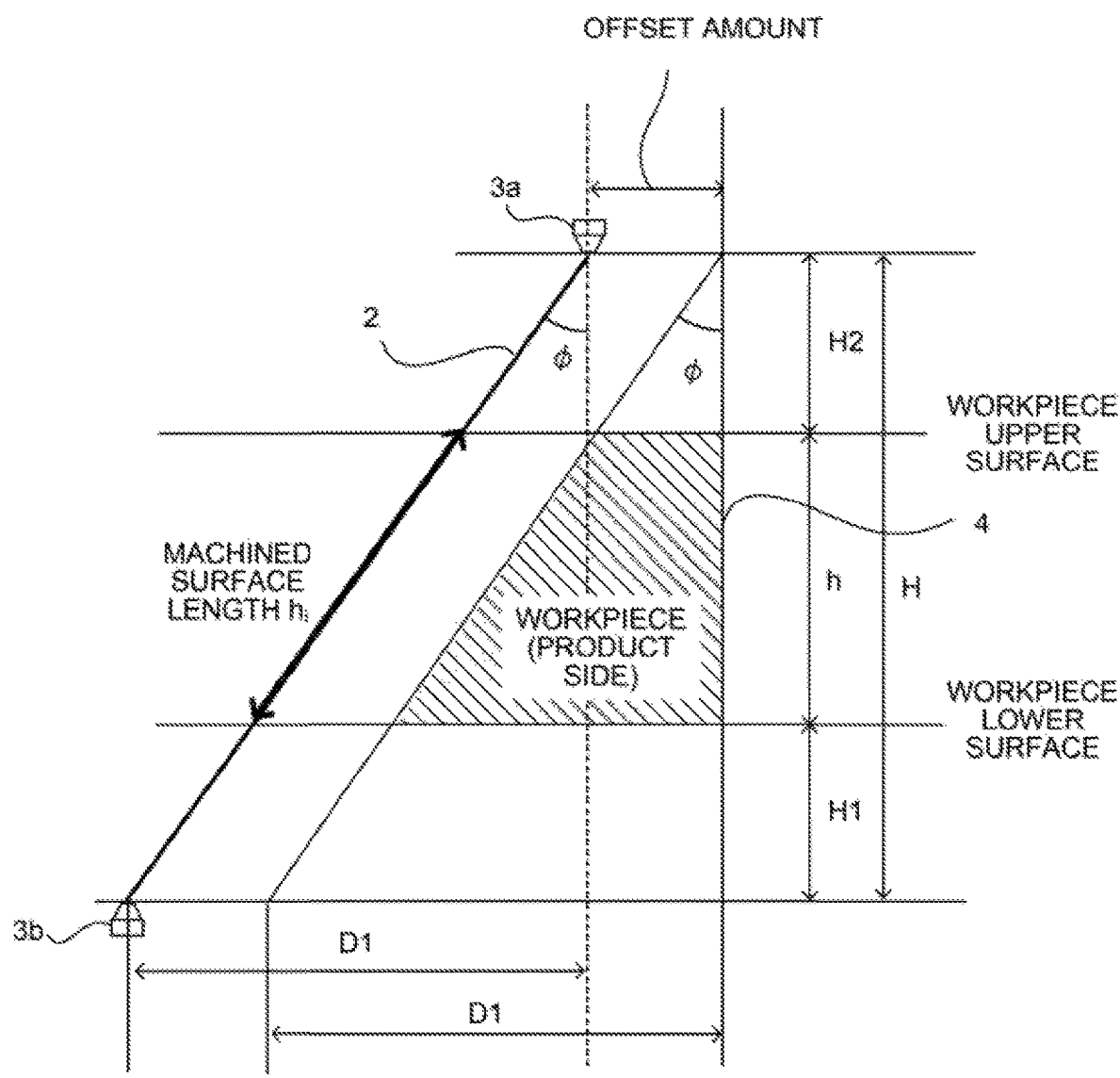
FIG. 4 is a diagram for description of a method of calculating a machined surface length $h_i$ by the numerical controller according to the embodiment of the invention.

The machined surface length calculation unit 120 calculates a machined surface length $h_i$ in which machining is performed by the wire electrode for each interpolation period with respect to the interpolation data created by the interpolation unit 110. The machined surface length calculation unit 120 may acquire shape data of a workpiece which is currently being machined from CAD data stored in advance in the machining information storage unit 210, and acquire the machined surface length $h_i$ based on the acquire shape data of the workpiece and a position of the wire electrode in the corresponding interpolation period. In addition, when taper machining is performed, the machined surface length calculation unit 120 may calculate the machined surface length $h_i$ at the time of taper machining illustrated in FIG. 4 by Equation (1) below using a height h of the workpiece at an upper guide position and an angle ϕ formed by a line connecting the upper guide 3a and the lower guide 3b and a vertical direction. In FIG. 4 and Equation (1), the machined surface length calculation unit 120 may further acquire the machined surface length $h_i$ using a machined surface length calculation method by CAD data and a method of calculating the machined surface length at the time of taper machining.

$$h_i = \frac{h}{\cos\phi} \quad (1)$$

The electrode consumption amount calculation unit 130 calculates a wire electrode consumption amount $d_i$ for each interpolation period based on a wire electrode consumption amount table and the machined surface length $h_i$ for each interpolation period calculated by the machined surface length calculation unit 120, wherein the wire electrode consumption amount table is a table in which the wire electrode consumption amount is associated with the combination of information related to machining such as a workpiece thickness, a workpiece material, a type of a wire electrode, a diameter of the wire electrode, a machining condition, and the like, stored in advance in the machining information storage unit 210 and information related to machining such as a workpiece thickness, a workpiece material, a type of a wire electrode, a diameter of the wire electrode, a machining condition, and the like, stored in advance in a consumption amount storage unit 220. As a wire electrode is generally consumed in proportion to a machined surface length, wire electrode consumption amount $d_i$ in case where machined surface length is $h_i$ is expressed by the following Equation (2) if assumed that wire electrode consumption amount is d in case where tentative workpiece thickness is $h_v$.

$$d_i = d \times \frac{h_i}{h_v} \quad (2)$$

The electrode consumption amount calculation unit 130 acquires wire electrode consumption amount d in case -where tentative workpiece thickness is $h_v$ from a wire electrode consumption amount table stored in advance in the consumption amount storage unit 220. The electrode consumption amount calculation unit 130 may set the tentative workpiece thickness $h_v$ to a height h of the workpiece included in the CAD data stored in the machining information storage unit 210 (a height of the workpiece at a position of the upper guide may be used when the height of the workpiece is different depending on the position). Alternatively, when a wire electrode consumption amount d corresponding to a combination of information related to machining matching the height h of the workpiece is not stored in the wire electrode consumption amount table, the electrode consumption amount calculation unit 130 may use a value closest to the height h of the workpiece among workpiece thicknesses registered in the wire electrode consumption amount table as the tentative workpiece thickness $h_v$. Hereinafter, a description will be given on the assumption that the tentative workpiece thickness $h_v$ is equivalent to the height h of the workpiece at the position of the upper guide.

Figure 5:
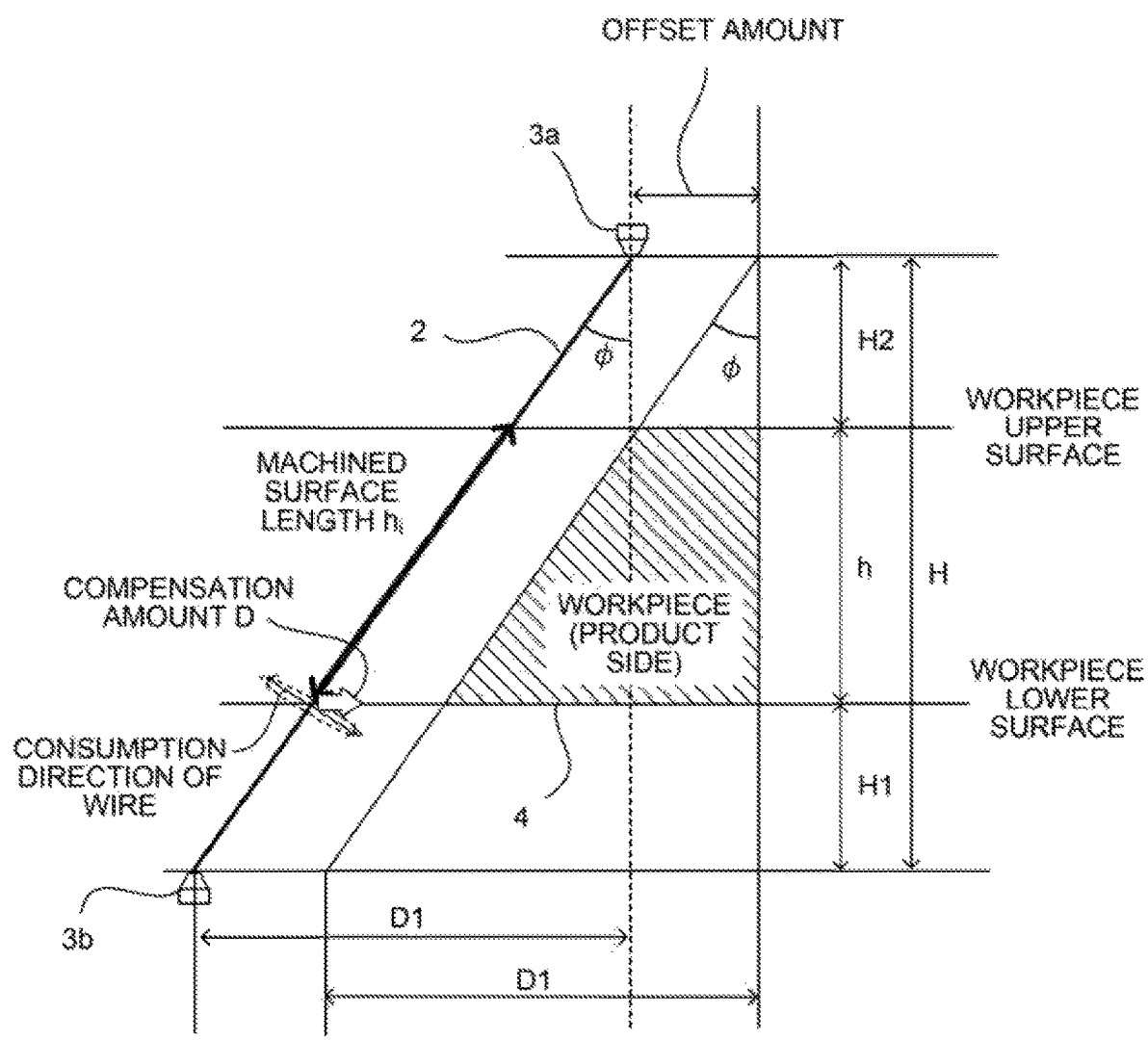
FIG. 5 is a diagram for description of a method of calculating a compensation amount D by the numerical controller according to the embodiment of the invention.

The compensation amount calculation unit 140 calculates an upper guide compensation amount and a lower guide compensation amount for each interpolation period based on the wire electrode consumption amount $d_i$ for each interpolation period calculated by the electrode consumption amount calculation unit 130. As illustrated in FIG. 5, since the wire electrode 2 is consumed in a normal direction with respect to a wire electrode center line, a wire electrode compensation amount D may be obtained by Equation (3) below using the wire electrode consumption amount $d_i$ (corresponding to a consumption amount in the normal direction with respect to the wire electrode center line) ($\phi=0$ when taper machining is not performed).

$$D = \frac{d}{2\cos^2\phi} \quad (3)$$

Figure 6:
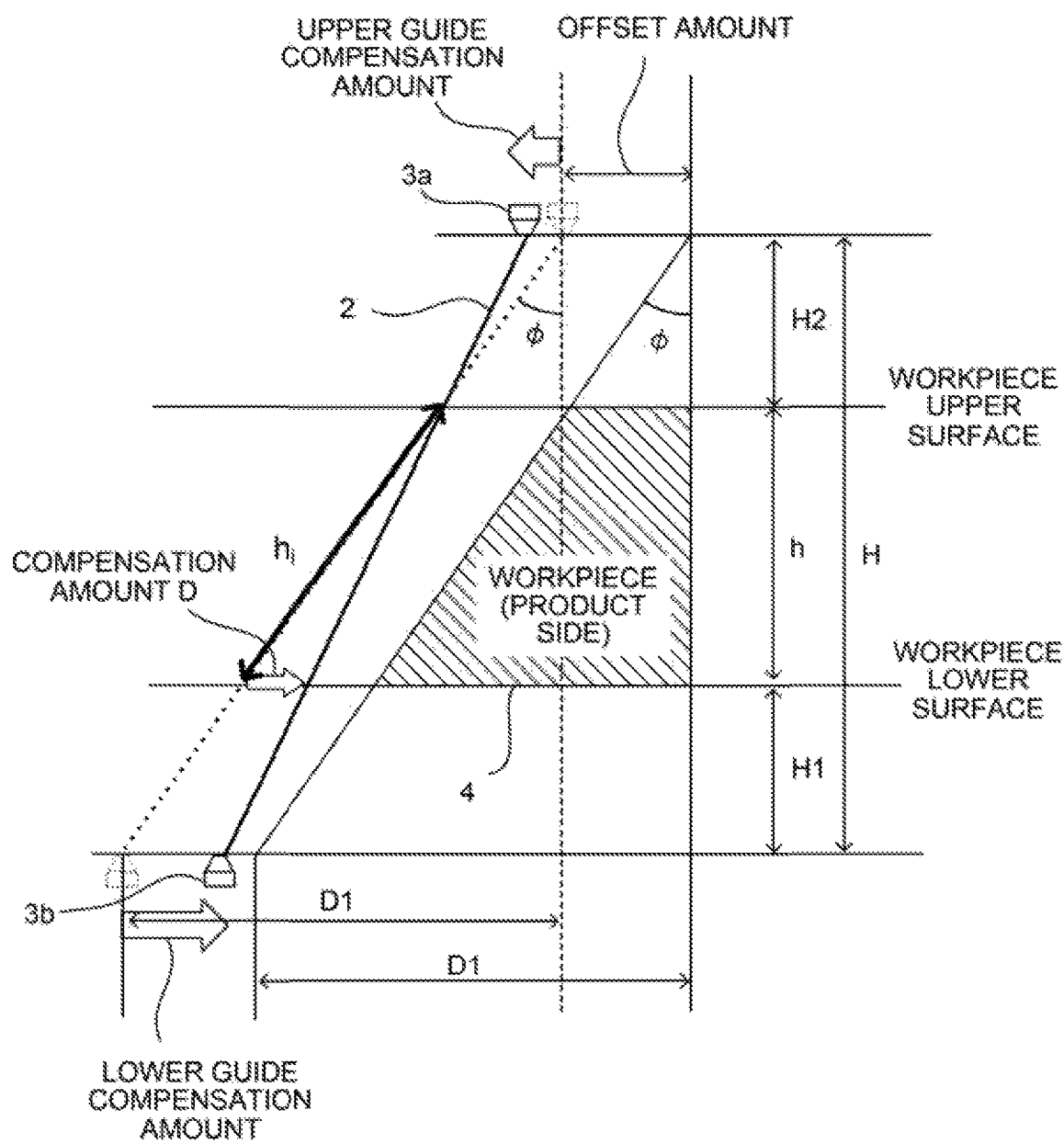
FIG. 6 is a diagram for description of a method of calculating an upper guide compensation amount and a lower guide compensation amount by the numerical controller according to the embodiment of the invention.
Figure 7:
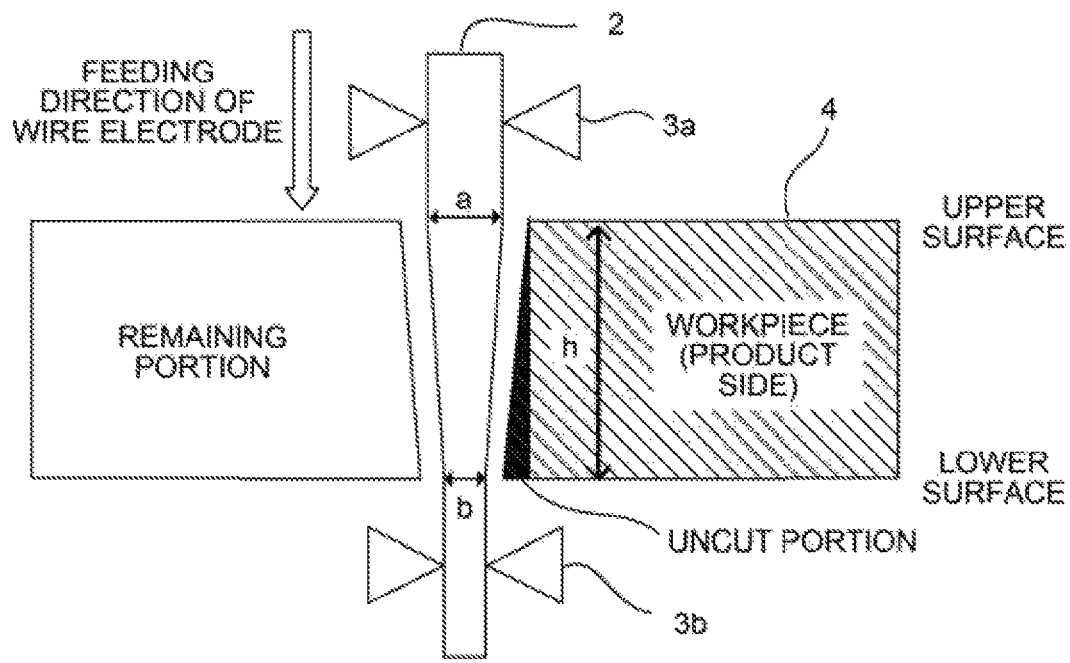
FIG. 7 is a diagram for description of a problem that an uncut portion is generated due to wire electrode consumption.
Figure 8:
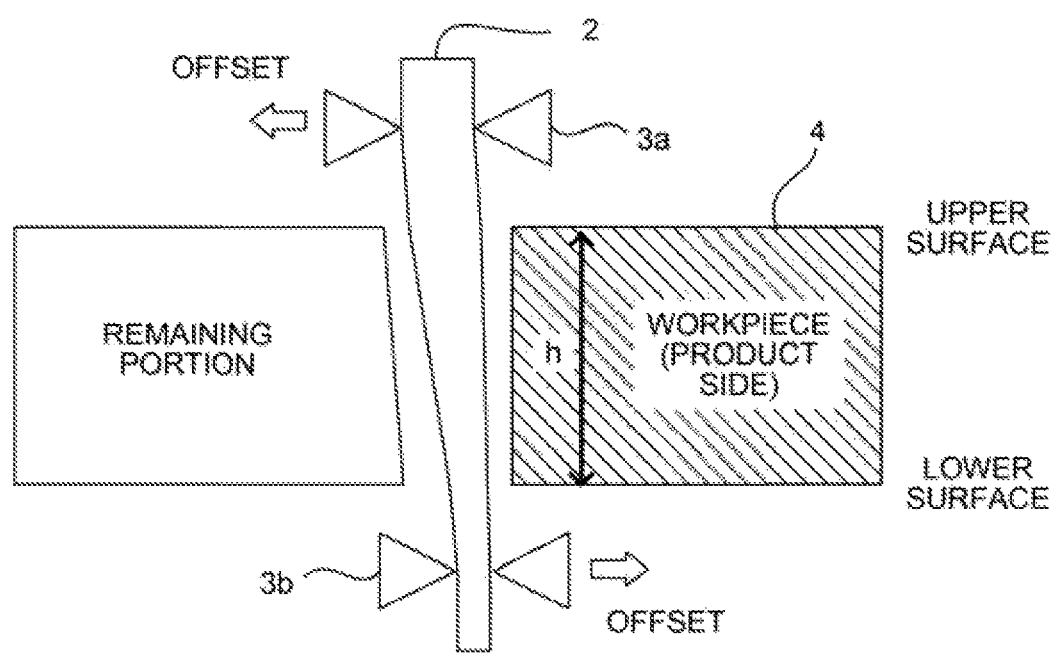
FIG. 8 is a diagram for description of a method of solving an uncut portion problem due to wire electrode consumption according to a conventional technology.
Figure 9:
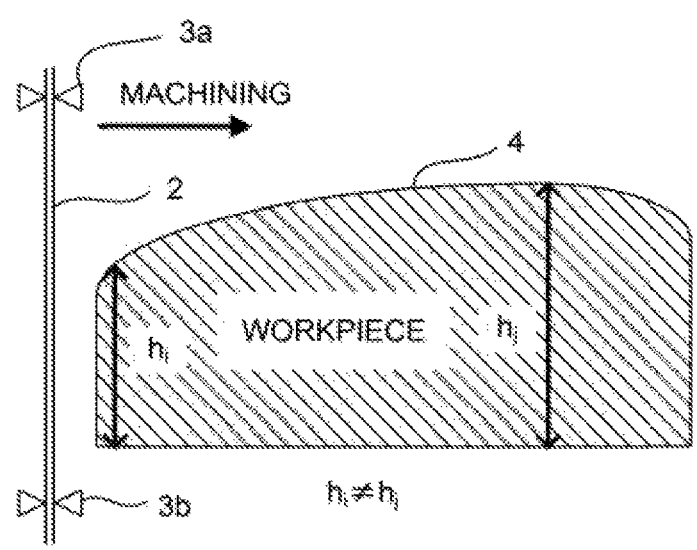
FIG. 9 is a diagram (1) for description of an uncut portion problem due to wire electrode consumption which could not be solved by a conventional technology.
Figure 10A:
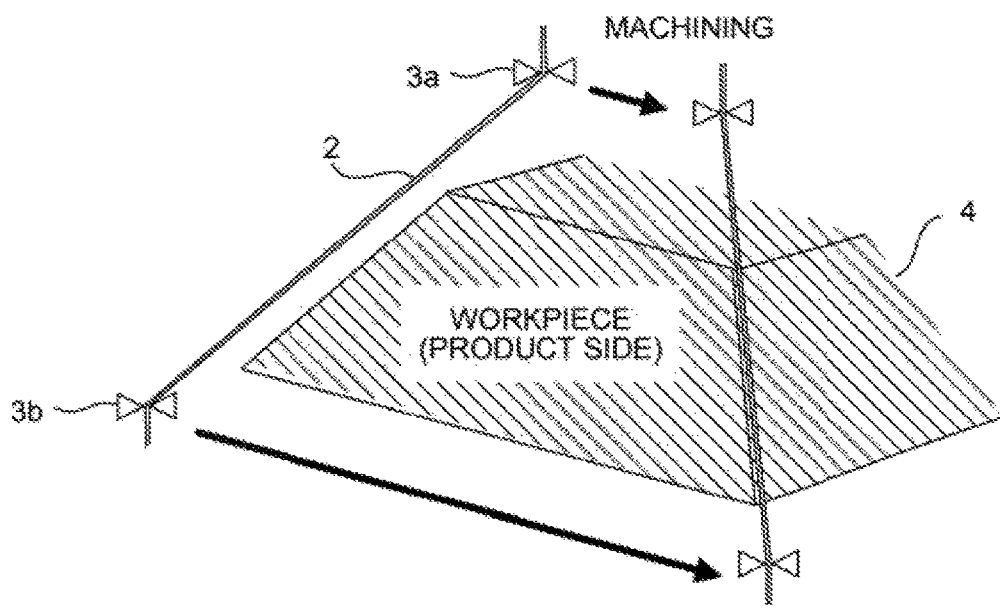
FIG. 10A and FIG. 10B are diagrams (2) for description of an uncut portion problem due to wire electrode consumption which could not be solved by a conventional technology.
Figure 10B:
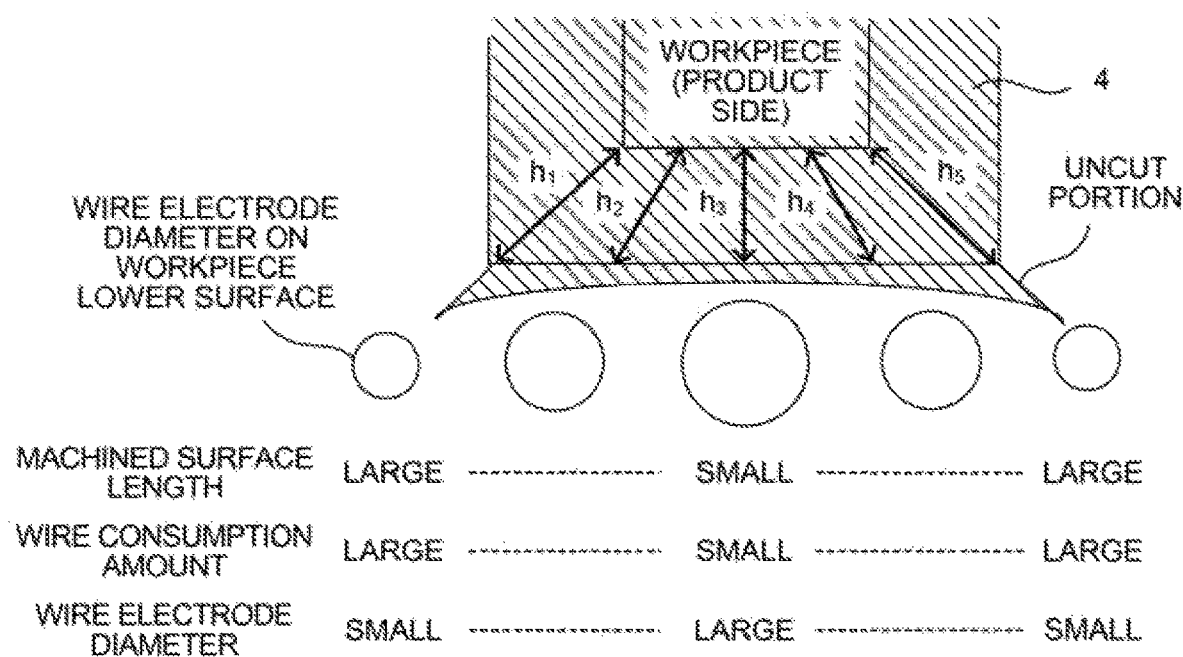
Figure 11:
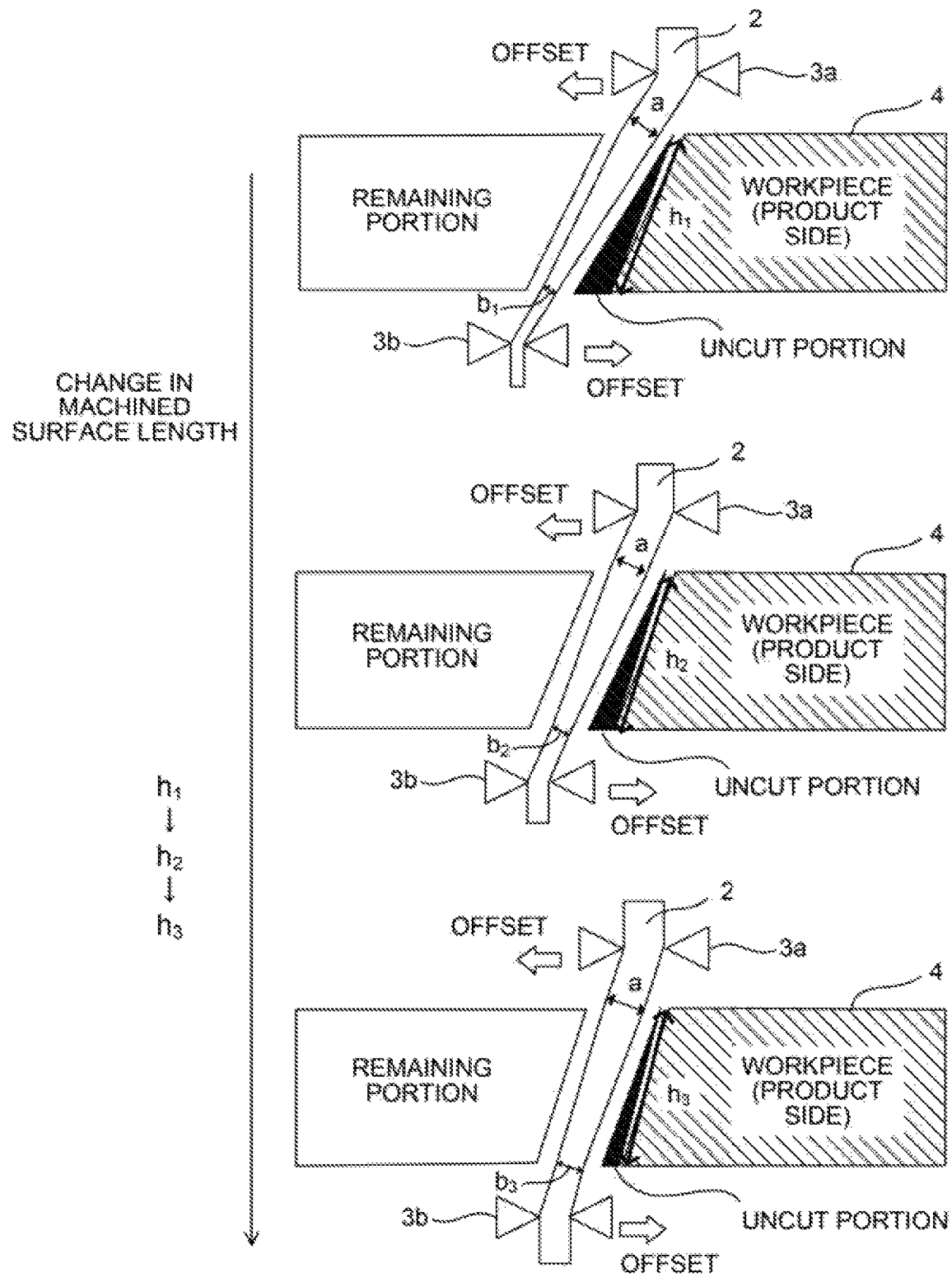
FIG. 11 is a diagram (3) for description of an uncut portion problem: due to wire electrode consumption which could not be solved by a conventional technology.

FIG. 6 illustrates the upper guide compensation amount and the lower guide compensation amount calculated by the compensation amount calculation unit 140.

The compensation amount calculation unit 140 calculates an electrode consumption rate in a workpiece lower plane direction illustrated in FIG. 6. The compensation amount calculation unit 140 calculates the upper guide compensation amount and the lower guide compensation amount illustrated in FIG. 5 using Equation (4) shown below ($\phi=0$ when taper machining is not performed).

$$\text{upper guide compensation amount} = -\left(D \times \frac{H2}{h}\right) = -\left(\frac{d}{2\cos^2\phi} \times \frac{H2}{h}\right) \quad \text{lower guide compensation amount} = D \times \frac{h+Hl}{h} = \frac{d}{2\cos^2\phi} \times \frac{h+Hl}{h} \quad (4)$$

The movement pulse addition unit 150 adds a movement pulse corresponding to the compensation amounts to the interpolation data on the basis of the upper guide compensation amount and the lower guide compensation amount that are calculated by the compensation amount calculation unit 140.

The coordinate update unit 160 updates a machine coordinate value of each axis of the wire electric discharge machine based on the movement amount to which the movement pulse based on the compensation amount in consideration of a machined surface length is added by the movement pulse addition unit 150.

Further, the servo control unit 170 controls the servomotor 50 that drives an axis of the wire electric discharge machine to be controlled based on the machine coordinate value updated by the coordinate update unit 160.

The embodiment of the invention has been described above. However, the invention is not limited only to an example of the embodiment described above, and may be implemented in various modes by making an appropriate change.

For example, even though the compensation amount of the wire electrode considering the machined surface length is calculated as the compensation amounts of the upper guide and the lower guide in the above embodiment, the compensation amount may be calculated as the compensation amount with respect to one of the guides and compensation amounts with respect to the X axis, the Y axis, and the Z axis.

The invention claimed is:

1. A numerical controller for controlling a wire electric discharge machine based on a machining program to move a wire electrode with respect to a workpiece, thereby machining the workpiece using the wire electrode, the numerical controller comprising:
a processor configured to:
create a machining path to move the wire electrode by analyzing blocks of the machining program;
create interpolation data indicating an amount of movement for each interpolation period on the machining path based on the machining path;
calculate a machined surface length corresponding to a length of the workpiece to be machined by the wire electrode for each interpolation period, the machined surface length calculated based on a thickness of the workpiece and an angle of the wire electrode relative to the workpiece;
calculate a consumption amount of the wire electrode for each interpolation period based on the machined surface length for each interpolation period; and
calculate a compensation amount for compensating the amount of movement according to the interpolation data based on the consumption amount of the wire electrode for each interpolation period,
wherein the wire electrode is moved on the basis of the amount of movement based on the interpolation data that is compensated by the compensation amount.

2. The numerical controller according to claim 1, wherein the wire electric discharge machine includes an upper guide and a lower guide supporting the wire electrode, and the compensation amount corresponds to compensation amounts of amounts of movement of the upper guide and the lower guide for each interpolation period.

* * * * *